United States Patent Office 3,297,008
Patented Jan. 10, 1967

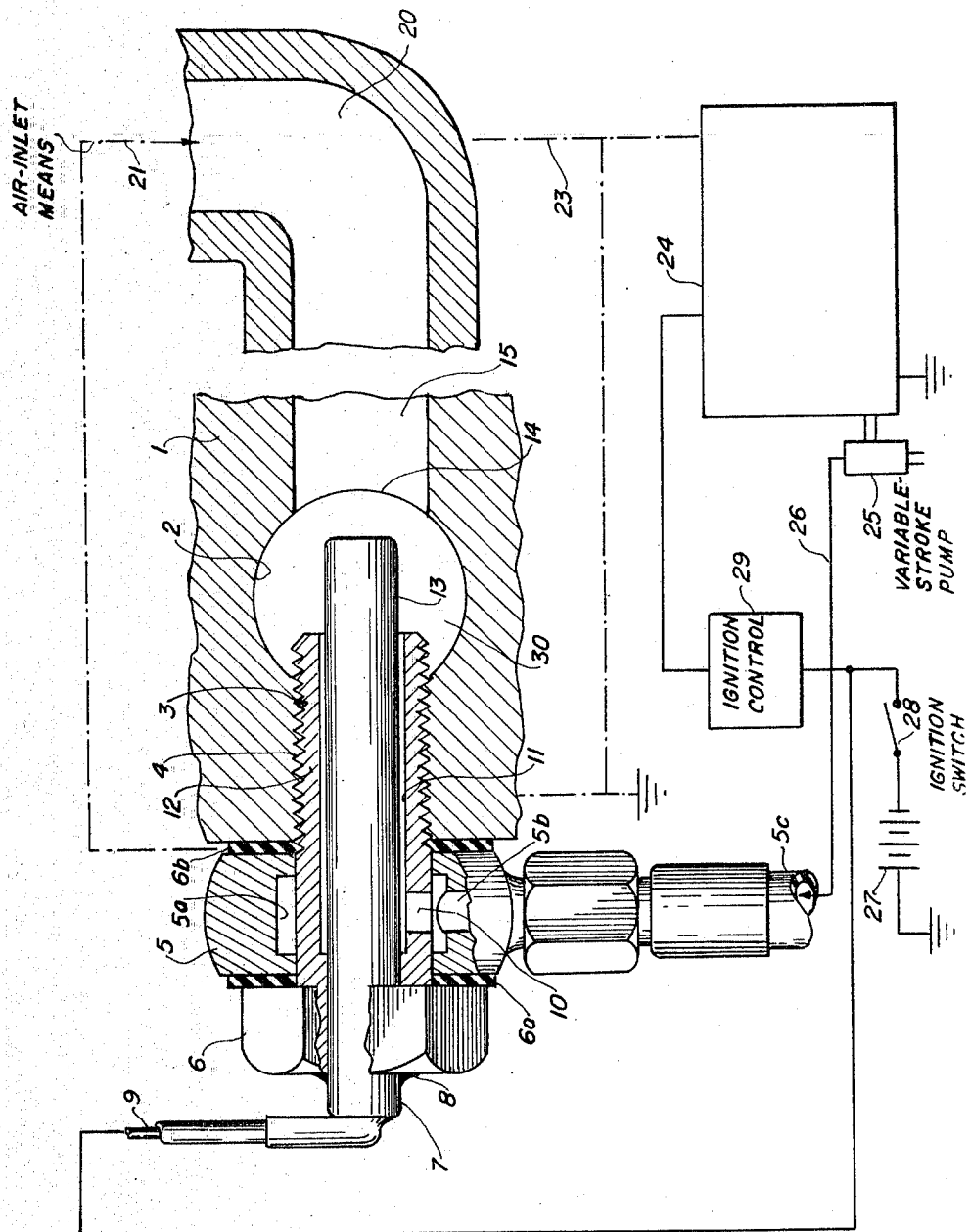

3,297,008
LUBRICATION SYSTEM FOR INTERNAL-COMBUSTION ENGINES
Ernst Alt and Bernhard Büchner, Ingolstadt, Günter Reges, Lenting, and Alfred Horak, Bittenbrunn, Germany, assignors to Auto Union G.m.b.H., Ingolstadt (Danube), Germany, a corporation of Germany
Filed Sept. 21, 1964, Ser. No. 397,791
Claims priority, application Germany, Sept. 24, 1963, A 44,124
14 Claims. (Cl. 123—127)

This application is a continuation-in-part of commonly owned United States patent application, Serial No. 236,537, filed on November 9, 1962, now Patent No. 3,179,099.

The present invention relates to an improved lubrication system for an internal-combustion engine and, more particularly, to a system wherein a flowable lubricant is admixed with a liquid fuel for introduction therewith into the engine to lubricate the moving parts thereof.

In contrast to the lubrication systems commonly in use for four-stroke or four-cycle internal-combustion engines, wherein the lubricant is forcibly circulated to the moving parts (i.e. crankshaft and connecting-rod bearings, pistons, etc.) of the engine, so-called two cycle/two-stroke engines have been lubricated heretofore by admixing the lubricant with the fuel (generally gasoline) and atomizing or vaporizing the admixture in the presence of air prior to the lubricant-entraining air/fuel mixture to the engine; it is with lubrication systems of this latter type that the present invention is concerned. In the commonly owned U.S. patent application Ser. No. 236,537, filed November 9, 1962, of which the present invention is a continuation-in-part, there is disclosed a system for metering the amount of lubricant to be admixed with the fuel prior to the atomization thereof in accordance with, among other parameters, the rate of rotation of the crankshaft, the fuel demand of the engine and, consequently, the load conditions of the latter. It has been found to be highly important to regulate the proportion of fuel and oil introduced to the engine in accordance with the rotation rate of the crankshaft and the rapidly changing loading conditions of the engine; when the engine is idling or under no load, for example, the lubricant demand is different from that required when the engine is under maximum strain (e.g. while climbing a steep hill in a fully loaded state of the vehicle) or under intermediate load (e.g. climbing a less steep hill or operating on level ground). These factors have been discussed in the aforementioned U.S. patent application. The latter describes a system wherein a variable-stroke pump is employed as part of the lubricant-supply means feeding the oil to the carburetor for admixture therein with the fuel and also points out some of the difficulties arising from thermally caused changes in the viscosity of the lubricant from the initial moments of vehicle or engine operation to the period in which the engine is heated by prolonged operation. In this patent application, moreover, the importance of having the lubricant introduced into the fuel passage of the carburetor rearwardly of the fuel inlet in the direction of flow of the mixture is set forth.

It is a commonly experienced difficulty in lubrication systems for two-cycle/two-stroke engines and other internal-combustion engines in which the lubrication of moving engine parts is carried out by admixing oil or some other flowable lubricant with the fuel prior to its introduction into the engine (generally via a carburetor in which the fuel is atomized—i.e. subdivided into a gaseous state or fine particles—in the presence of a combustion-sustaining gas) that excess lubricant causes carbonization in the region of the intake and exhaust apertures of the cylinder wall and, therefore, results in partial blocking of these apertures as the carbon accumulates; this, in turn, reduces the efficiency of the engine and increases the down-time thereof. Carbonization also is found to occur—with conventional lubrication systems—in the exhaust passages of the engine with obvious disadvantages. During starting of such engines, especially in extremely cold weather, oil droplets frequently form barriers to the passage of the lubricant/fuel mixture into the atomizing chamber of the carburetor as a consequence of the increased viscosity of the lubricant. These barriers prevent the fuel from reaching the chamber as required for the initial operation of the engine. Another difficulty arising from the presence of lubricant droplets in the passage leading to the atomizing chamber is that such droplets may form rearwardly of the fuel inlet and prevent admixture of the lubricant with the fuel during engine starting; when the starter is actuated, therefore, pure fuel (i.e. containing no lubricant) is supplied to the engine and, for at least an initial period, some of the bearings or frictional surfaces of a multicylinder engine are not freshly lubricated and are even freed from residual lubricant by the fuel. These surfaces are thus prone to rapid deterioration while the engine efficiency is sharply reduced.

It is, therefore, the principal object of the present invention to provide an improvement lubricating system wherein a lubricant is admixed with fuel prior to the feeding thereof to an internal-combustion engine.

Another object of this invention is to extend the principles set forth in our copending U.S. patent application mentioned above and provide, in an internal-combustion engine, improved means for lubricating the working parts thereof by admixing a lubricant with the fuel.

Yet another object of our present invention is to provide a carburetor for a two-stroke/two-cycle internal-combustion engine adapted to obviate the afore-described disadvantages of conventional systems for admixing a lubricant and a fuel.

These objects and others which will become apparent hereinafter are attained, in accordance with the instant invention, by providing a lubrication system for an internal-combustion engine which is capable of eliminating the formation of oil droplets which inconvenience cold starts and which, even at the initial moments of operation of the engine, ensures the availability of the lubricant in a flowable state incapable of blocking entry of fuel or further quantities of lubricant into the mixing passage and facilitating admixture of fuel with the lubricant, thereby eliminating the need for excessive operation of the starter, preventing carbonization, and ensuring that the fuel supplied to the engine will always be admixed with the requisite quantity of lubricant. The lubricating system of the present invention thus includes a body (e.g. the carburetor, atomizer or gasifier) formed with a passage for the lubricant/fuel mixture communicating with the atomizing volatilization chamber, preferably via a suitable nozzle or the like, as described in our aforementioned copending application; fuel-supply means along the passage for introducing the liquid fuel (generally gasoline) to the passage; a lubricant-supply duct provided in the body and communicating with the passage for feeding the flowable lubricant to the latter, the lubricant-supply duct being fed in turn by suitable means—such as the variable-stroke pump of the system of our copending U.S. patent application Serial No. 236,537, filed November 9, 1962—and heating means in the form of an elongated heating element disposed in this duct and extending therealong for heating the lubricant prior to the introduction thereof into the fuel/lubricant passage.

The heating means ensures that the lubricant flowing along the element through the lubricant-supply duct is warmed and of reduced viscosity; the lubricant can thus meet the fuel, which also may be more or less heated, in the mixing zone without the formation of droplets of high viscosity so that all such droplets are eliminated. The heating elements, preferably energized electrically, define within the duct a narrow elongated annular clearance, according to a further feature of this invention, through which the lubricant—whose viscosity is decreased by heating—flows as a thin film with a relatively large surface area and combines with the fuel while still in the form of a film. The large specific surface (i.e. ratio of surface area to volume) of the tubular film facilitates its dispersion or dissolution in the fuel even when the lubricant prior to its passage through the clearance is a somewhat viscous fatty oil. This tubular film, even in the absence of the electrical heating element, substantially eliminates the possibility of the formation of droplet barriers along the passage as a consequence of the high specific surface of the lubricant at its junction with the fuel.

According to yet another feature of this invention, the lubricant-supply duct is formed by an elongated tube threaded into the carburetor body coaxially and in alignment with the linearly extending passage, the fuel-supply conduit extending transversely of this passage forwardly of this tube. The electric heating element can then have a cylindrical configuration and extend into this duct from the end of the tube remote from the passage, while being fixed in the threaded tube by circumferential welding, hard-soldering, or the like.

To prevent overheating of the fuel and, therefore, premature volatilization thereof within the passage with formation of entrapped gases and the danger of ignition, the invention also provides means incorporated in the ignition-control circuit of the engine for electrically energizing the heating element only upon operation of the engine (e.g. upon turning on the ignition or actuating the starter). The energizing circuit means for the heating element can thus include the so-called "terminal 61" of the two-cycle engine or vehicle incorporating same. The heating element is cooled during continuous operation of the vehicle by the lubricant and fuel respectively drawn through the mixture passage so that premature ignition or volatilization of the fuel is precluded.

Yet a further feature of our invention is designed to insure the limited preheating of the fuel in addition to the lubricant, a convenience especially in cold weather; this feature resides in the formation of the electric heating element with an extremity projecting axially beyond the lubricant-supply duct and threaded tube into the region of the fuel-supply conduit and into the path of the fuel emerging therefrom. In this zone, the passage widens so that its diameter is in excess of the outer diameter of the tubular film of lubricant whereby both the oil and the fuel surrounding the oil film in proximity to the heating element are warmed. The heat of the electric element is not, however, transferred to the surrounding portions of the carburetor body to any significant extent, thereby enabling the available heat of the element to be used efficiently, i.e. without loss, in the warming of lubricant and fuel. The heating capacity of the electric element can, therefore, be relatively low (e.g. about 15 watts). In any event, this heating capacity should be so selected as to be just sufficient to permit the lubricant to maintain a thin film without formation of droplets. This further ensures that premature volatilization or ignition of the fuel will not occur. The extremity of the heating element should, however, terminate short of the mouth of the passage by an axial distance (e.g. about 3 mm.) sufficient to guarantee that a reduction in the velocity of the mixture flowing into the passage does not take place. Best results are obtained when the extremity and the fuel/lubricant mixing zone terminate at the point at which the flow velocity of the mixture is at a maximum, thereby simultaneously insuring an efficiency of mixing. By having the duct axially aligned with the passage, the mixture has imparted thereto the desired direction of flow and the lubricant throughput is not materially throttled by sudden increases in the flow of fuel as results when the accelerator is actuated.

The above and other objects, features and advantages of the present invention will become more readily apparent from the following specific description of an internal-combustion-engine system, reference being made to the accompanying drawing, the sole figure of which is a diagrammatic view of the system with a portion of the carburetor shown in vertical cross-section.

In the drawing, the carburetor of the system is generally represented by the reference numeral 1 and is diagrammatically illustrated with the region of fuel/lubricant mixing displayed in cross-section. The carburetor may be of the type described in our abovementioned U. S. patent application Ser. No. 236,537, filed November 9, 1962, and can be formed with an atomizing chamber 20 into which air is drawn in the conventional manner via a schematically illustrated air inlet 21 from an air cleaner or filter. The fuel/lubricant mixture is dispersed in chamber 20 via a nozzle 22 as mentioned in the aforesaid patent while a diagrammatically represented conduit 23 carries the fuel/air mixture, in which the lubricant is dispersed, into the engine 24 via the usual intake passages. The engine 24 is of the two-stroke/two-cycle type and is provided with a variable-stroke pump 25, driven by a powered shaft of the engine, for supplying lubricant to the carburetor via line 26 from a supply reservoir not illustrated. The supply reservoir, variable-stroke pump and engine are described in our patent application Ser. No. 236,537, filed November 9, 1962 and it is noted that the engine system is also provided with the usual carburetor controls (e.g. butterfly valve) and throttle lever for regulating the supply of fuel to the engine. These controls, which are tied to the pump to control the lubricant-displacement capacity thereof, are not illustrated since they are fully described in this patent and are not material to the present improvement.

The carburetor 1 is constituted by a body formed with fuel-supply conduit 2 extending transversely of a threaded bore 3 adapted to receive a threaded tube 12 whose shank 4 is screwed into the bore 3. The tube 12 has a wrench-engageable prismatic head 6 which clamps an annular connecting member 5 between a pair of sealing rings 6a, 6b, against an outer wall of the carburetor body. The connecting member 5 is provided with an internal recess 5a opening toward the tube 12 and supplied with lubricant via a radial passage 5b by a flexible tube 5c connected with the pump 25 or, in the absence of the pump, to an oil sump from which the lubricant is drawn to the carburetor as a consequence of the reduced pressure developed therein. An elongated electric heating element 7 extends through the interior of tube 12 and defines in the central lubricant-supply duct of this tube a narrow annular clearance 11. This clearance is connected via a radial port 10 with the recess 5a. The electric heating element 7 is fixed in place within the tube 12 by welding (e.g. by circumferential hard-soldering at 8). The energizing circuit for the heating element 7 includes a lead 9 connectable to the so-called "terminal 61" of the system, the outer surface of the heating element being grounded by the soldered joint. In a simplified circuit ensuring operation of the heating element only when the engine is in operation, one terminal of the battery 27 is grounded while the other terminal feeds the ignition and/or starting switch 28; the latter, upon closing, operates the ignition control 29 of the engine (i.e. spark plugs, breaker points, etc.) as well as the heating element 7.

An extremity 13 of the cylindrical heating element 7 projects beyond the threaded tube 12 in the direction of flow of the lubricant but terminates short of the mouth 14 of the passage 15 axially aligned with the clearance 11, this passage communicating with the atomizing nozzle 22. The extremity 13 thus lies in the path of fuel emerging from the fuel-supply conduit 2.

In the inoperative state of the engine, the heating element is unenergized. When the ignition is turned on, however, and the starter (not shown) is actuated, the heating element 7 is simultaneously energized and supplies just enough heat to decrease the viscosity of the lubricant. Concurrently, the rotation of the crankshaft by the starter causes a reduced pressure in the usual suction tube of the engine whereby the fuel is pumped into the passage 15 via the conduit 2. In dependence upon the throttle setting, oil is fed through the tube 5c and along the heating element in an amount usually ranging between $\frac{1}{40}$ and $\frac{1}{100}$ of the fuel volume. In extremely cold weather, the lubricant becomes fat-like and highly viscous and is forced through the clearance 11 along the electric heating element 7 in the form of a thin-walled tube of oil which is carried on the extremity 13 of this heating element into the path of the fuel. During this extrusion of the lubricant, it is prewarmed and contacts the fuel with a relatively large surface area; the dissolution or dispersion of the lubricant in the fuel occurs at a rate determined by the diameter of the tubular film. When the oil film covering the extremity 13 of the heating element dissolves in the fuel, the available heat is transferred from this element directly to the fuel since the lubricant and fuel meet in a chamber 30 whose diameter is in excess of that of the tubular film whereby the extremity 13 is entirely surrounded by fuel. Since the passage 15 is relatively constricted as compared with the chamber 30, the velocity of the mixture increases as it passes through the mouth 14, thereby increasing the mixing efficiency. Even in cold weather when the lubricant has a kneadable fat-like consistency for a prolonged period, there is little chance that the extruded tubular film of lubricant will block the fuel-inlet conduit 2 since the tubular film is so thin as to be unable to constitute a mechanical barrier to the fuel and is also readily soluble in the fuel in spite of a high viscosity. From the passage 15, the fuel/lubricant mixture passes into the atomizing chamber wherein it is finely divided and admixed with the combustion-sustaining gas prior to introduction into the engine in a conventional manner.

The invention as described and illustrated is believed to admit of modifications which will be readily apparent to those skilled in the art and which are considered to lie within the spirit and scope of the appended claims.

What is claimed is:

1. In an internal-combustion engine wherein a lubricant is admixed with fuel to lubricate moving parts of the engine upon operation thereof, the improvement which comprises: mixing means for admixing flowing lubricant with a liquid fuel, said mixing means including: a body formed with a passage for lubricant/fuel mixture; fuel-supply means along said passage for introducing said liquid fuel thereto; a lubricant-supply duct provided in said body and communicating with said passage for introducing said flowable lubricant thereto; and heating means along said duct for heating said lubricant prior to the introduction thereof into said passage.

2. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means along said passage for introducing said liquid fuel thereto; means providing a lubricant supply duct communicating with said passage rearwardly of said fuel-supply means in the direction of flow of said mixture for introducing said flowable lubricant to said passage; and an electric heating element disposed within said duct for heating said lubricant prior to the introduction thereof into said passage.

3. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means along said passage for introducing said liquid fuel thereto; means providing a lubricant-supply duct communicating with said passage rearwardly of said fuel-supply means in the direction of flow of said mixture for introducing said flowable lubricant to said passage; and an element disposed within said duct and defining therein a narrow elongated annular clearance for said lubricant whereby the latter is admixed as a tubular stream with said fuel upon introduction into said passage.

4. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means along said passage for introducing said liquid fuel thereto; means providing a lubricant-supply duct communicating with said passage rearwardly of said fuel-supply means in the direction of flow of said mixture for introducing said flowable lubricant to said passage; and an electric heating element disposed within said duct and defining therein a narrow elongated annular clearance for heating said lubricant whereby the latter is admixed as a heated tubular stream with said fuel upon into said passage.

5. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture, fuel-supply means along said passage for introducing said liquid fuel thereto; means providing a lubricant-supply duct communicating with said passage rearwardly of said fuel-supply means in the direction of flow of said mixture for introducing said flowable lubricant to said passage; an electric heating element disposed within said duct for heating said lubricant prior to the introduction thereof into said passage; and means for electrically energizing said heating element only upon operation of said engine.

6. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means along said passage for introducing said liquid fuel thereto; means providing a lubricant-supply duct communicating with said passage rearwardly of said fuel-supply means in the direction of flow of said mixture for introducing said flowable lubricant to said passage; an electric heating element disposed within said duct and defining therein a narrow elongated annular clearance for heating said lubricant whereby the latter is admixed with said fuel as a tubular stream upon introduction thereof into said passage; and means for electrically energizing said heating element only upon operation of said engine.

7. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture, fuel-supply means including a conduit having an opening communicating with said passage for introducing said liquid fuel thereto; means providing a lubricant-supply duct communicating with said passage rearwardly of said fuel-supply means in the direction of flow of said mixture for introducing said flowable lubricant to said passage; and an electric heating element disposed within said duct for heating said lubricant prior to the introduction thereof into said passage, said heating element having an extremity projecting beyond said duct into the region of said opening into the path of fuel emerging therefrom into said passage.

8. In an internal-combustion engine wherein a lubricant is admixed with fuel to lubricate moving part of the engine upon operation thereof, the improvement which comprises mixing means for admixing a flowable lubricant with a liquid fuel, said mixing means including: a body formed with a passage for lubricant/fuel mixture; fuel-supply means including a conduit extending transversely of said passage and having an opening communicating therewith for introducing said liquid fuel to said passage; means providing a lubricant-supply duct generally axially aligned with said passage and communicating therewith rearwardly of said fuel-supply means in the direction of flow of said mixture for introducing said flowable lubricant to said passage, and an electric heating element coaxially disposed within said duct for heating said lubricant prior to the introduction thereof into said passage, said heating element having an extremity projecting axially beyond said duct into the region of said opening into the path of fuel emerging therefrom into said passage.

9. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means including a conduit extending transversely of said passage and having an opening communicating therewith for introducing said liquid fuel to said passage; means providing a lubricant-supply duct generally axially aligned with said passage and communicating therewith rearwardly of said fuel-supply means in the direction of flow of said mixture for introducing said flowable lubricant to said passage; and an electric heating element coaxially disposed within said duct and defining therein a narrow elongated annular clearance for heating said lubricant whereby the latter is admixed with said fuel as a tubular stream upon introduction thereof into said passage, said heating element having an extremity projecting axially beyond said duct into the region of said opening into the path of fuel emerging therefrom into said passage.

10. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means including a conduit extending transversely of said passage and having an opening communicating therewith for introducing said liquid fuel to said passage; means providing a lubricant-supply duct generally axially aligned with said passage and communicating therewith rearwardly of said fuel-supply means in the direction of flow of said mixture for introducing said flowable lubricant to said passage; an electric heating element coaxially disposed within said duct for heating said lubricant prior to the introduction thereof into said passage, said heating element having an extremity projecting axially beyond said duct into the region of said opening into the path of fuel emerging therefrom into said passage; and means for eletcrically energizing said heating element only upon operation of said engine.

11. In an internal-combustion engine wherein a lubricant is admixed with fuel to lubricate moving parts of the engine upon operation thereof, the improvement which comprises mixing means for admixing a flowable lubricant with a liquid fuel, said mixing means including: a body formed with a passage for lubricant/fuel mixture; fuel-supply means including a conduit extending transversely of said passage and having an opening communicating therewith for introducing said liquid fuel to said passage; means providing a lubricant-supply duct generally axially aligned with said passage and communicating therewith rearwardly of said fuel-supply means in the direction of flow of said mixture for introducing said flowable lubricant to said passage, an electric heating element coaxially disposed within said duct and defining therein a narrow elongated annular clearance for heating said lubricant whereby the latter is admixed with said fuel as a tubular stream upon introduction thereof into said passage, said heating element having an extremity projecting axially beyond said duct into the region of said opening into the path of fuel emerging therefrom into said passage; and means for electrically energizing said heating element only upon operation of said engine.

12. A carburetor for a two-stroke internal-combustion engine to which fuel is supplied admixed with a lubricant to lubricate moving parts of the engine, said carburetor comprising a body provided with an atomizing chamber, air-inlet means communicating with said atomixing chamber for supplying air thereto for admixture with a fuel-lubricant mixture in said chamber upon atomization of said mixture therein, said body being formed with a linearly extending passage communicating at one end with said chamber and terminating remote from said chamber in a mouth, said passage conducting said fuel/lubricant mixture to said chamber for atomization therein; fuel-supply means including a conduit extending transversely of said passage and communicating therewith adjacent said mouth for introducing liquid fuel to said passage; an elongated tube threaded into said body and defining therein a linearly extending lubricant-supply duct aligned with said passage and terminating rearwardly of said conduit at said mouth for introducing flowable lubricant to said passage for admixture with said fuel at said mouth; an elongated electric heating element coaxially disposed within said duct and defining therein a narrow longitudinally extending annular clearance through which said lubricant passes in a thin tubular film toward said mouth while being heated by said element prior to admixture with said fuel, said element having an extremity projecting axially beyond said duct into the region of said conduit while terminating short of said mouth; and means exteriorly of said body for feeding said lubricant to said longitudinally extending annular clearance.

13. A carburetor as defined in claim 12 wherein said heating element extends outwardly of said tube remote from said extremity and is soldered to said tube exteriorly of said body.

14. A carburetor as defined in claim 13, further comprising circuit means for energizing said heating element only upon operation of said engine, said element having a heating capacity just sufficient to permit said lubricant to maintain a thin film without formation of droplets.

References Cited by the Examiner
UNITED STATES PATENTS

| | | | |
|---|---|---|---|
| 1,644,838 | 10/1927 | Jorgensen. | |
| 2,935,057 | 5/1960 | Perlewitz | 123—73 |
| 3,137,285 | 6/1964 | Ausserbauer | 123—119 |
| 3,140,700 | 7/1964 | Nallinger | 123—199 |
| 3,150,651 | 9/1964 | Buchner et al. | 123—122 |
| 3,215,417 | 11/1965 | Whitmore et al. | 123—122 X |

MARK NEWMAN, Primary Examiner.

A. L. SMITH, Assistant Examiner.